Dec. 30, 1941.   H. E. CORBITT   2,268,375
POLARITY DEVICE
Original Filed Jan. 27, 1939   2 Sheets-Sheet 1

INVENTOR.
HOWARD E. CORBITT
BY
ATTORNEY

Dec. 30, 1941. H. E. CORBITT 2,268,375
POLARITY DEVICE
Original Filed Jan. 27, 1939   2 Sheets-Sheet 2
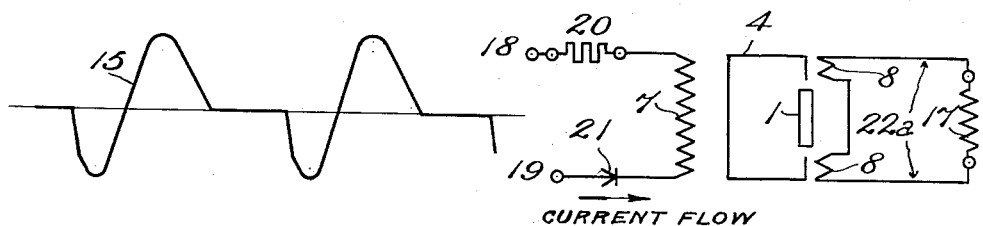
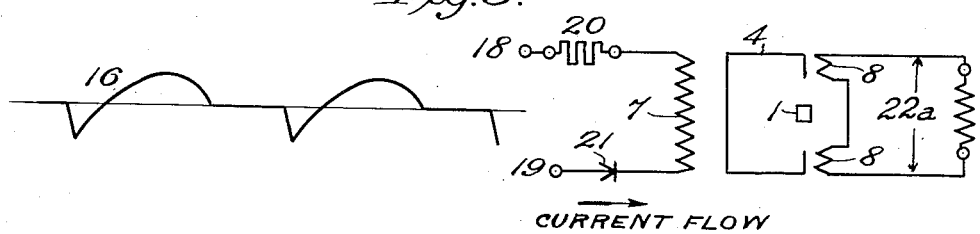
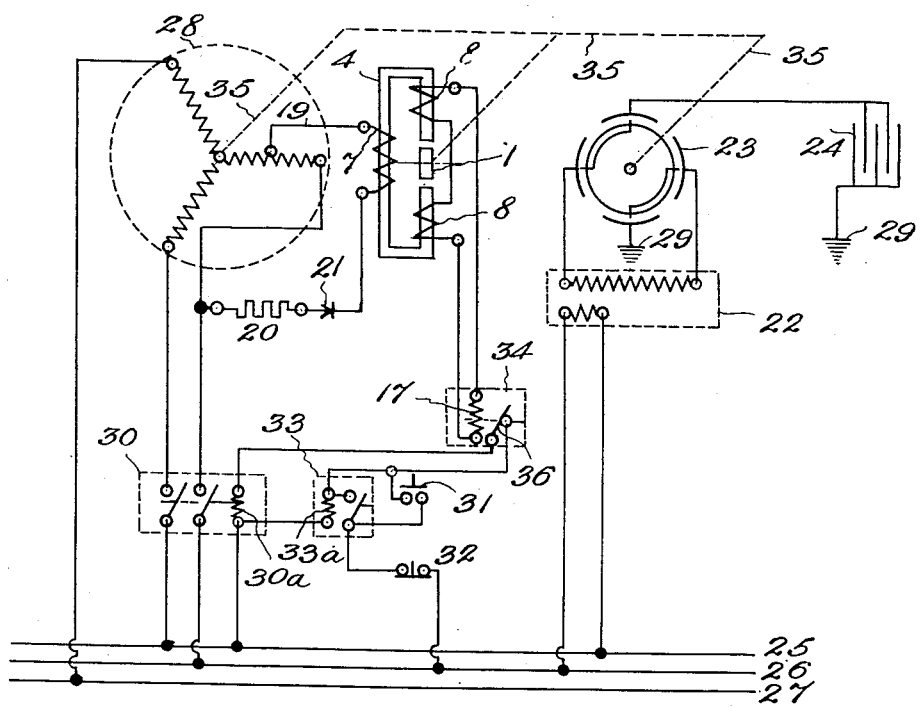
INVENTOR.
HOWARD E. CORBITT
BY
ATTORNEY Patented Dec. 30, 1941

2,268,375

UNITED STATES PATENT OFFICE 2,268,375

POLARITY DEVICE

Howard E. Corbitt, Alhambra, Calif., assignor to Percy E. Landolt, New York, N. Y., as trustee Original application January 27, 1939, Serial No. 253,125. Divided and this application June 23, 1941, Serial No. 399,383

7 Claims. (Cl. 175—364)

The present invention relates to polarity devices, and, more particularly, to a polarity device of novel and improved character adapted for operation in connection with an electrical precipitator system.

As those skilled in the art know, in electrical precipitator systems high unidirectional voltages are employed which are generally obtained by stepping-up the voltage of an alternating current source by means of a transformer and then rectifying the high alternating current potential by means of a rotary rectifier driven by means of a synchronous motor supplied with current from the same alternating current source. In order to provide the proper polarity of the unidirectional or rectified voltage on the precipitator electrodes, it was necessary to obtain a predetermined phase relationship between the rotation of the motor and the voltage of the alternating current source. In practical operation it frequently happened that after the motor reached synchronous speed, the unidirectional voltage obtained from the rectifier had the opposite or wrong polarity. According to prior practice, this condition was corrected by disconnecting the synchronous motor for a time sufficient to let the rotor slip back by 180° (electrical) whereby the desired and proper polarity was obtained. Of course, this procedure caused inconvenience and considerable loss of time as frequently several attempts were necessary before the proper polarity was obtained.

It was already suggested to provide automatic devices for obtaining the desired and proper polarity of the rectified voltage by automatically effecting connection of the synchronous motor to the source of current or its temporary disconnection from the source of current in the desired and proper sequence. All of these prior devices, however, involved the application of relatively complex circuits and included commutators or sliding contacts cooperating with the synchronous motor. Experience has demonstrated that these devices frequently suffered from operating difficulties and especially the rotary contacts were a constant source of trouble and required frequent replacements. Although also various other suggestions and proposals were made to solve the outstanding problem and to provide a polarity device of completely satisfactory character, none of these suggestions or proposals was completely satisfactory or successful on a practical and industrial scale.

I have discovered a novel polarity device which completely eliminates all of the difficulties and inconveniences connected with the construction and operation of conventional devices.

It is another object of the present invention to provide a polarity device which relies for its operation on closing and opening of a magnetic circuit operatively associated with the synchronous motor of the rotary rectifier and which is completely free from rotary contacts, brushes and other sources of operating difficulties.

It is a further object of the invention to provide a polarity device which may be mounted on the frame of the synchronous motor driving the rotary rectifier and which has a stationary portion and a rotary portion, the rotary portion being free from current conducting elements thereby avoiding the necessity for contact rings, brushes, and the like.

The invention also contemplates a polarity device adapted to be mounted on the synchronous motor driving a rotary rectifier and having an electrical system connected therewith capable of effecting connection of the source of alternating current to the step-up transformer in the proper time relationship thereby to automatically obtain the desired and proper polarity of the high unidirectional voltage on the precipitator electrodes.

The invention also contemplates a polarity device and an electrical system associated therewith which is simple in character, positive and foolproof in operation and which may be readily manufactured and used on an industrial scale at a low cost.

Other and further objects of the invention will become apparent from the following description taken in conjunction with the accompanying drawings, in which:

Figs. 4 and 5 show two possible wave forms that may be obtained with the polarity device when it is operating as shown in the wiring diagram of Fig. 6; and Fig. 6 is a complete wiring diagram of the polarity device embodying the invention.

Broadly stated, according to the principles of my invention, I provide a magnetic circuit having a stationary portion adapted to be mounted on the frame of the synchronous motor driving a rotary rectifier and having a rotary portion rigidly connected to the shaft of the synchronous motor, and adapted to periodically close a gap in the magnetic circuit during rotation of said motor. The effect of the rotation of the synchronous motor on this magnetic circuit will be to complete it and to substantially interrupt the same, or to increase its resistance to a substantial extent, a predetermined number of times per second, dependent upon the speed of rotation of the synchronous motor. In cooperation with this magnetic circuit, I provide stationary primary and secondary coils which are exposed to the effect of the variations in the magnetic flux present in the circuit. The primary coil is supplied with unidirectional and pulsating current derived from the alternating current source of the synchronous motor through a half-wave rectifier. The secondary coils are connected to the electrical system proper and are capable to cause the actuation of a relay, provided the current induced therein reaches at least a predetermined minimum value.

During rotation of the synchronous motor, the resistance in the magnetic circuit will periodically vary, as a result of the opening and closing of the gap in said circuit by the rotary portion thereof. Generally speaking, it is possible that each time when the pulsating current in the primary coil obtains its maximum value, the magnetic system has its minimum of resistance, or vice versa. Accordingly, the amount of current flowing in the secondary coil, or coils may be of a substantial value or of a relatively low value, dependent upon the phase relationship between the alternating current and the polarity of the direct current impulses derived from the half-wave rectifier. In the first case, a relay operatively associated with the secondary coils may be actuated and may cause interruption and reclosing of the main circuit of the synchronous motor within a predetermined time interval and thereby can re-establish the proper polarity of the output of the rotary rectifier as it will be explained more fully hereinafter.

Figure 1:
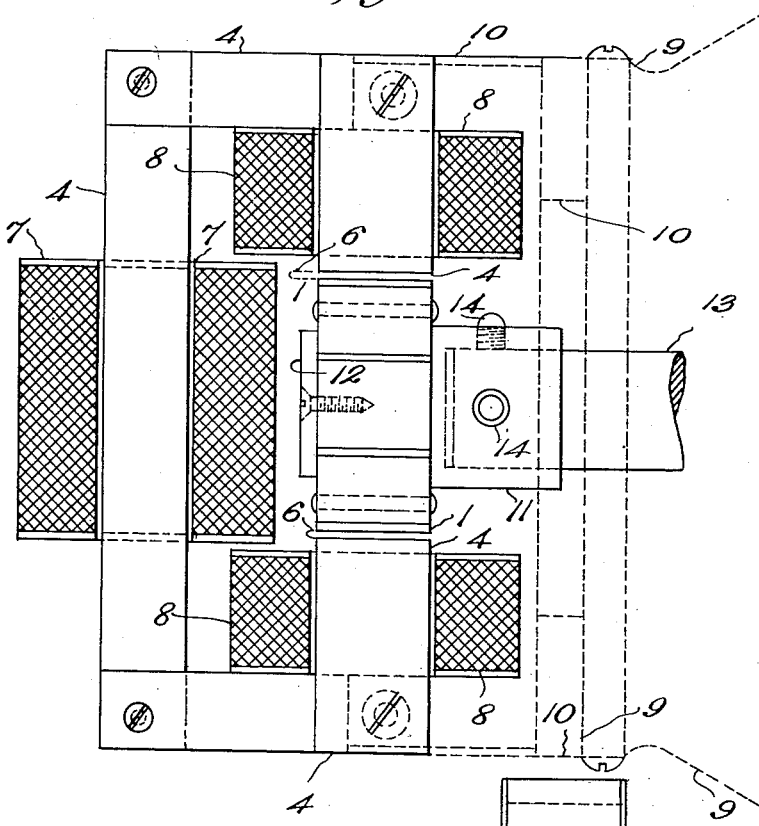
Fig. 1 illustrates a side elevational view having parts in section of the polarity device embodying the present invention.

Referring now more particularly to the drawings, Fig. 1 illustrates a side elevational view having parts in section of a polarity device embodying the principles of the present invention and drawn to approximately full scale. Reference character 4 denotes the laminated iron stator which is attached to the end frame of rectifier motor 9 by means of a brass casting 10; 1 denotes the laminated iron rotor attached to a brass casting 11 and held in position by means of clip 12 and a screw associated therewith. Around stator frame 4 at about its mid-point is provided a primary coil 7 having its terminals connected to a source of alternating current through a resistor and a half-wave rectifier. Also around the stator frame 4 are provided two secondary coils 8 being positioned as close to air gap 6 as practicable. These secondary coils are connected in series and their terminals are connected to the operating coil of a single-pole relay. In Fig. 1, rotor 1 is shown in the position which presents a minimum air gap 6. If the rotor 1 was rotating synchronously in this position and at this synchronous time the half-wave rectifier permitted current to pass through coil 7, then coils 8 would present their maximum potential to the terminals of the operating relay above mentioned. 13 is the rectifier motor shaft and 14 denotes set screws for attaching member 11 to said shaft.

Figure 2:
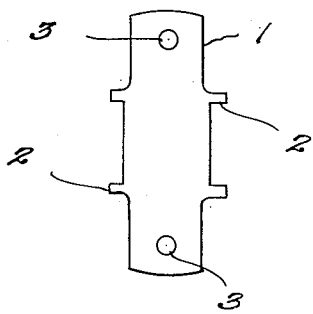
Fig. 2 depicts one of the laminations employed in the rotor of the polarity device.
Figure 3:
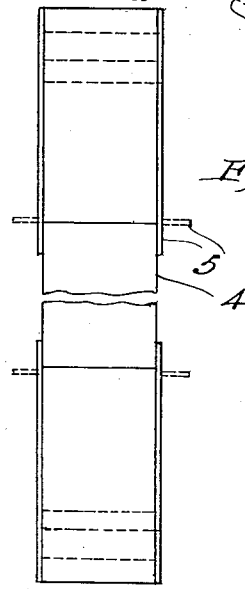
Fig. 3 shows a front elevation of the stator frame assembly of the polarity device.

The shape of the laminations employed in the polarity device will be best seen in Figs. 2 and 3. Of these, Fig. 2 shows a front elevation of one lamination of the iron rotor of the polarity device, reference character 1 denoting the lamination itself. Lamination 1 is provided with four ears 2 projecting outwardly in such a manner that a casting may be attached to the central body of the assembled laminations. Rivet holes 3 are provided in the laminations for connecting them into a rigid and unitary structure. Fig. 3 shows a front elevational view of the stator lamination iron frame after assembly and as it would appear when viewed from the end of the rectifier motor. Reference character 4 denotes the stator assembly, and reference character 5 denotes the four outermost laminations, the extensions of which are bent back as shown by the dotted lines after the coils are slipped in place.

The operation of the polarity device embodying the present invention will be best understood from Fig. 6. Reference character 22 denotes a high voltage transformer, the secondary winding of which is connected to a mechanical rectifier 23, the rectified high voltage current being supplied to a precipitator 24. The primary winding of high voltage transformer 22 is connected to leads 25 and 26 of a source of three-phase alternating current 25, 26 and 27. The mechanical rectifier is driven by means of a 4-pole, three-phase squirrel cage induction motor 28 having slots cut in its iron rotor to simulate a 4-pole machine, this motor starting as an induction motor and running as a synchronous motor having no brushes, or separate excitation. Obviously, motor 28 may come up to synchronous speed in two positions with respect to mechanical rectifier 23 which is mounted directly on the shaft of the rotor of motor 28. Thus, assuming that the rotor of mechanical rectifier 23 has a certain point thereon synchronously opposite to the stator shoe connected to ground 29, when a change of 180 mechanical degrees would not change the polarity of 29. A change of 90 mechanical degrees, however, in either direction would change the polarity of ground 29. In other words, motor 28 may come up to synchronous speed so that ground 29 is positive, and it also may come up to speed so that ground would be of the opposite polarity, or negative. Normal precipitation requires that ground 29 be positive. The circuit and associated devices shown in Fig. 6 are of such character that the ground may be automatically maintained at preferred and pre-selected polarity and that this selection may be obtained before transformer 22 is connected to the power line, without requiring any brushes or similar frictional devices on motor 28.

One phase of the power supply, lead 27, is directly connected to one lead of three-phase rectifier motor 28. The other two leads 25 and 26 are connected to the remaining two leads of rectifier motor 28 through a two-pole magnetic switch 30. A start push button 31 of the momentary make type and a stop push button of the momentary break type 32 are provided. The circuit also includes an auxiliary relay 33 which is a single-pole, open when de-energized, magnetically operated switch, and a polarity device relay 34 which is a single-pole, closed when de-energized, magnetically operated switch. The polarity selector device proper comprises an iron stator 4 mounted on the end frame of rectifier motor 28; and an iron rotor 1 attached directly to the rotor of the rectifier motor 28 as indicated by dotted line 35. Rotor 1 is so positioned as to form part of the magnetic circuit of stator 4. On stator 4 is wound a primary coil 7 and close to the air gaps between rotor and stator, but around the stator, are wound two secondary coils 8 forming a secondary circuit under the transformer action of primary coil 7. A low voltage tap 19 from one phase of the rectifier motor is connected to one terminal of primary winding 7, and the other terminal is connected to this low voltage through a half-wave rectifier 21 and a resistor 20. These connections are made on the motor side of motor starter switch 30 so that this circuit is open when the motor starter switch is open.

When it is desired to place rectifier motor 28 in operation, push button 31 is momentarily depressed. This connects power supply lead 26 through the closed contact of push button 32 to one terminal of the operating coil 33a of auxiliary relay 33, the other terminal of this operating coil being connected to lead 25 of the power supply. This operates relay 33 which closes its single-pole contact causing current to flow from power supply lead 26 through closed contact push button 32, through the now closed contact of auxiliary relay 33 to its own operating coil terminal and thence back to power supply lead 25. The auxiliary relay will remain in this position until push button 32 is momentarily opened. Upon such actuation of relay 33, motor starter switch 30 will be energized as follows: Current flows from power supply lead 25 through the operating coil 30a of motor starter switch 30, through the closed contacts of the single pole polarity device relay 34 and back to power supply lead 26 through the now closed contacts of relay 33 and closed contact of push button 32. Thus, the two-pole motor starter switch 30 is actuated and closes its contacts, applying the three-phase power supply lead 25, 26 and 27 to the leads of rectifier motor 28. When the motor is energized, potential is applied to the primary winding of polarity device 7 through a reduced voltage tap described in the foregoing. The secondary coils of this polarity device 8 are connected to the operating coil of single-pole relay 34. As motor 28 reaches synchronous speed, a potential appears across the operating coil of relay 34 and its magnitude depends upon the relation between the direction of current flow through the half-wave rectifier 21 and the synchronous position occupied by the polarity device rotor 1 with respect to its stator 4. Sufficient time is required to cause the closed contact 36 of polarity device relay 34 to operate so that the starting of rectifier motor 28 cannot cause contact 36 to operate until synchronous speed is reached. Therefore, only potentials applied to operating coil 7 during synchronous operation of rectifier motor 28 need be considered.

If the half-wave rectifier 21 permits current to flow at a time when rotor 1 is in such a position as to provide a minimum air gap in the magnetic circuit of 4 and 1, then a large voltage will be applied across the operating coil of relay 34. Relay 34 is so adjusted as to be operated by this potential, opening single-pole contact 36, thus in turn opening the operating coil circuit of motor starter 30. As soon as this motor starter 30 opens the circuit of motor 28, the potential is removed from the operating coil of polarity device relay 34. This causes its contact 36 to close again which in turn energizes motor starter 30 and also energizes motor 28. When contact 36 of relay 34 is adjusted for proper timing, motor 28 may be removed from power leads 25 and 26 and reconnected in such a manner that rectifier motor 28 will drop back one or an odd number of poles which is required for correcting the wrong polarity of mechanical rectifier 23.

If motor 28 comes up to speed and mechanical rectifier 23 is 90 mechanical degrees earlier or later than that assumed in the above illustration, and the half-wave rectifier 21 allows current to pass synchronously as before, rotor 1 of the polarity device will be in such synchronous position as to provide a maximum air gap in the magnetic path of stator 4 and rotor 1. Of course, it is assumed that the mechanical rectifier 23 is maintained in its previous mechanical relationship on the shaft of motor 28 with respect to rotor 1. A minimum potential now appears across the terminals of operating relay coil 17 because the transformer action of primary coil 7 upon secondary coils 8 is greatly decreased due to flux leakage. This potential is insufficient to operate relay 34, as it may easily be as little as one-third of the potential required to operate the relay. This is the condition of normal operation when the polarity of the mechanical rectifier 23 is correct with respect to the precipitator 24.

Figs. 4 and 5 depict the wave forms obtained from the polarity device embodying the present invention and represent two possible synchronous positions. Reference character 15 in Fig. 4 denotes the wave form which is sufficient to operate relay coil 17, while 16 in Fig. 5 denotes the wave form which is insufficient to actuate the relay. The circuits shown in Figs. 4 and 5 are identical in all respects, except that the synchronous position of the rotor 1 is different. Terminals 18 and 19 are connected to a source of alternating current which is connected in series with a resistor 20, with primary coil 7 of the polarity device, and a half-wave rectifier 21. The magnetic circuit of the device is formed by an iron stator 4 and an iron rotor 1. In Fig. 4 stator and rotor are shown in the synchronous position of minimum air gap while the current is passed by rectifier 21 and in Fig. 5 stator and rotor are shown in the synchronous position of maximum air gap while the current is passed by rectifier 21. Stator 4 carries two secondary polarity device coils 8 which are connected in series with each other and with a relay coil 17. Reference character 22a indicates the points between which a cathode ray oscillograph was connected to obtain oscillograms 15 and 16.

It will be noted that the polarity device of the invention provides important advantages. First of all, a novel and improved device is provided which is completely automatic in its operation and does not rely in any way on the competency or skill of the operator. At any time when the device is connected, the proper and desired polarity will be obtained on the precipitator electrodes with the complete exclusion of errors and completely avoiding the danger of improper connections.

It is also to be observed that the polarity device of the invention is extremely simple in construction and due to the complete absence of sliding contacts, rings or commutators, it is free from the most important source of trouble of prior devices of similar character.

Of course, those skilled in the art will readily appreciate that the device of the invention may be applied with equal or similar results to installations different from precipitator systems such as, for example, X-ray installations and other systems wherein a high voltage alternating current is converted into unidirectional current by means of a synchronous rotary rectifier.

Although the present invention has been described in connection with a preferred embodiment thereof, variations and modifications may be resorted to by those skilled in the art without departing from the principles of the present invention. I consider all of these variations and modifications as within the true spirit and scope of the present invention as disclosed in the foregoing description and defined by the appended claims.

The present application is a division of my copending application Serial No. 253,125, filed January 27, 1939, now Patent No. 2,247,361, issued July 1, 1941.

I claim:

1. In an electrical system including a source of alternating current, a rotary rectifier driven by a synchronous motor and a load connected to the output of said rectifier; a polarity selector device comprising in combination an iron stator bearing a primary coil connected to said source of alternating current, a half-wave rectifier in series with said primary coil, secondary coils mounted on said stator and in the magnetic circuit thereof, a rotor attached to the rotor of said synchronous motor and forming part of said magnetic circuit, and means actuated by the current induced in said secondary coils for controlling the polarity of rectified voltage on said load.

2. In an electrical system including a source of alternating current, a rotary rectifier driven by a synchronous motor and a load connected to the output of said rectifier; a polarity selector device comprising in combination an iron stator mounted on the end frame of said synchronous motor, a primary coil mounted on an intermediate portion of said stator and a pair of secondary coils mounted on the terminal portions of said stator, a half-wave rectifier connected in series with said primary coil and with said source of alternating current, an iron rotor directly attached to the rotor of said synchronous motor forming part of the magnetic circuit of said stator and being adapted to intermittently complete said circuit during the rotation thereof, and means actuated by the current induced in said secondary coils for interrupting the circuit of said synchronous motor for a predetermined time interval sufficient to obtain correction of the polarity of the rectified voltage on said load.

3. In an electrical system including a high voltage transformer connected to a source of alternating current, a rotary rectifier driven by a synchronous motor and a load connected to the output of said rectifier; a polarity selector device comprising in combination a substantially C-shaped iron stator mounted on the end frame of said synchronous motor, a primary coil mounted on the intermediate portion of said stator and a pair of secondary coils mounted close to the air gap in said stator, a half-wave rectifier connected in series with said primary coil and with said source of alternating current and adapted to establish an intermittent magnetic field in said stator, an iron rotor directly attached to the rotor of said synchronous motor and positioned in said air gap, said rotor forming part of the magnetic circuit of said stator and being adapted to intermittently complete said magnetic circuit during the synchronous rotation thereof whereby strong current impulses will be generated in said secondary coils when the time intervals during which said stator is energized through said half-wave rectifier coincide with the intervals when said rotor completes the air gap in said stator, and means responsive to said strong current impulses for interrupting the circuit of said synchronous motor for a predetermined time interval sufficient to obtain correction of the polarity of the rectified voltage on said load.

4. In a rectifier system including a rotary rectifier connected to a source of alternating current and a synchronous motor driving said rectifier, a polarity selector device comprising in combination a magnetic circuit, a primary and a secondary selector circuit mounted in cooperative position with said magnetic circuit and in inductive relation with respect to each other, a half-wave rectifier connected in series with said primary circuit and with said source of alternating current and adapted to periodically energize said magnetic circuit, a magnetizable element interposed in said magnetic circuit and rotated at identical velocity with said synchronous motor adapted to periodically increase the inductive coupling between said primary and said secondary circuit to cause induction of current impulses in said secondary circuit, and means electrically associated with said secondary circuit and responsive to predetermined intensities of said impulses for controlling the polarity of the output of said rotary rectifier.

5. In a rectifier system including a rotary rectifier connected to a source of alternating current and a synchronous motor driving said rectifier, a polarity selector device comprising in combination a stationary magnetizable member, a rotatable magnetizable member rotated by said synchronous motor and adapted to periodically form a substantially closed magnetic circuit with said stationary member, primary and secondary coils mounted on said stationary member in inductive relation with respect to each other, a half-wave rectifier connected in series with said primary coil and with said source of alternating current and adapted to periodically energize said magnetic circuit, and means responsive to a predetermined value of current impulses induced in said secondary coils for interrupting the circuit of said synchronous motor for a predetermined time interval sufficient to correct the polarity of the rectified direct current voltage.

6. In a rectifier system including a rotary rectifier connected to a source of alternating current and a synchronous motor fed from the same source for driving said rectifier, a polarity selector device comprising in combination a stationary magnetizable member, a rotatable magnetizable member rotated by said synchronous motor at a speed identical with that of said motor and adapted to periodically form a substantially closed magnetic circuit with said stationary member, primary and secondary coils in inductive relation with each other and with said magnetic circuit, a half-wave rectifier connected in series with said primary coil and with said source of alternating current and adapted to periodically energize said coil and said magnetic circuit whereby relatively strong current impulses will be induced in said secondary coil when the periodical closing of the magnetic circuit coincides with the periodical energizing of said primary coil and relatively weak current impulses will be induced in said secondary coil when the periodical closing of the magnetic circuit does not coincide with the periodical energizing of said primary coil, and switching means responsive to said strong impulses but unaffected by said weak impulses for interrupting the motor circuit for a time interval sufficient to correct the polarity of the rectified direct current voltage.

7. In a rectifier system for producing high unidirectional potential from an industrial low voltage alternating current source including a high-voltage step-up transformer connected to said source and a mechanical rectifier of the rotary spark gap type connected to said transformer and driven by a synchronous motor fed from the same source; a polarity selector device comprising in combination a stationary magnetizable member, a rotatable magnetizable member rotated by said synchronous motor and adapted to periodically form a substantially closed magnetic circuit with said stationary member, primary and secondary coils mounted on said stationary member in inductive relation with respect to each other, a half-wave rectifier connected in series with said primary coil and with said source of alternating current and adapted to periodically energize said magnetic circuit, and means responsive to a predetermined value of current impulses induced in said secondary coils for interrupting the circuit of said synchronous motor for a predetermined time interval sufficient to correct the polarity of the rectified direct current voltage.

HOWARD E. CORBITT.